US011176179B2

(12) United States Patent
Cohoon et al.

(10) Patent No.: US 11,176,179 B2
(45) Date of Patent: Nov. 16, 2021

(54) ASSIGNING A NEW PROBLEM RECORD BASED ON A SIMILARITY TO PREVIOUS PROBLEM RECORDS

(71) Applicant: International Business Machines Corporation, Armonk, NY (US)

(72) Inventors: Michael Terrence Cohoon, Fishkill, NY (US); James A. O'Connor, Ulster Park, NY (US); Steven Lafalce, Salt Point, NY (US); Steven Burchfield, New York, NY (US); Morey Materise, Dutchess, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 16/580,166

(22) Filed: Sep. 24, 2019

(65) Prior Publication Data

US 2021/0089561 A1 Mar. 25, 2021

(51) Int. Cl.
*G06F 16/28* (2019.01)
*G06F 16/93* (2019.01)

(52) U.S. Cl.
CPC ............ *G06F 16/285* (2019.01); *G06F 16/93* (2019.01)

(58) Field of Classification Search
CPC ............................... G06F 16/285; G06F 16/93
USPC ....................................................... 707/738
See application file for complete search history.

(56) References Cited

U.S. PATENT DOCUMENTS

| 9,508,062 | B2 | 11/2016 | Harris et al. |
| 9,836,455 | B2 | 12/2017 | Martens et al. |
| 10,565,234 | B1* | 2/2020 | Sims ...................... G06F 40/12 |
| 2009/0070101 | A1 | 3/2009 | Masuyama et al. |
| 2010/0179933 | A1* | 7/2010 | Bai ...................... G06F 16/3334 |
| | | | 706/12 |
| 2019/0130024 | A1 | 5/2019 | Burchfield et al. |

FOREIGN PATENT DOCUMENTS

| CN | 108595706 A | 9/2018 |
| KR | 101681109 | 11/2016 |
| WO | 2012030049 A2 | 3/2012 |

OTHER PUBLICATIONS

Han et al., "Centroid-based document classification: Analysis and experimental results", In European conference on principles of data mining and knowledge discovery, Sep. 2000, (pp. 424-431).

(Continued)

*Primary Examiner* — Evan Aspinwall
(74) *Attorney, Agent, or Firm* — Cantor Colburn LLP; Steven Chiu

(57) ABSTRACT

Aspects of the invention include receiving a new problem record. A corpus of existing problem records that were previously assigned to problem record owners and grouped into documents based on their assigned problem record owners is accessed. Each document in the corpus has an assigned problem record owner. A document in the corpus that is most similar to the new problem record is identified. The identifying includes comparing text in the new problem record to text in the documents. The new problem record is assigned to the problem record owner that is assigned to the identified document.

15 Claims, 6 Drawing Sheets

(56) References Cited

OTHER PUBLICATIONS

Hand et al., "A note on using the F-measure for evaluating record linkage algorithms", Statistics and Computing, 28(3), 539-547, 2018, 10 pages.

Simov, G. et al., "Automatic discovery of training documents for text classifiers", IP.com, IP.com No. IPCOM000189107D, Publication date: Oct. 28, 2009, 6 pages.

* cited by examiner

ASSIGNING A NEW PROBLEM RECORD BASED ON A SIMILARITY TO PREVIOUS PROBLEM RECORDS

BACKGROUND

The present invention generally relates to assigning problem records, and more specifically, to assigning a new problem record based on a similarity to previous problem records.

The testing and debugging of complex systems often take long periods of time and can lead to the identification of a large number of problems that may require design modifications and other changes to the system in order to correct them. Innovations that can reduce the number of problems or speed problem resolution are desired since they will speed delivery of systems to customers. Computer systems are one example of a complex system composed of large numbers of interacting hardware, firmware, and software components that work together. As system problems are detected in test, it is important to try to assign the problem to the design team for the component that needs to be modified in order to fix the detected problem. This however is no simple matter, especially when there are a large number of components. Accurate problem assignment can be challenging, and inaccurate assignments result in delays in resolving problems.

SUMMARY

Embodiments of the present invention include assigning new problem records based on a similarity to previous problem records. A non-limiting example computer-implemented method includes receiving a new problem record. A corpus of existing problem records that were previously assigned to problem record owners and grouped into documents based on their assigned problem record owners is accessed. Each document in the corpus has an assigned problem record owner. A document in the corpus that is most similar to the new problem record is identified. The identifying includes comparing text in the new problem record to text in the documents. The new problem record is assigned to the problem record owner that is assigned to the identified document.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
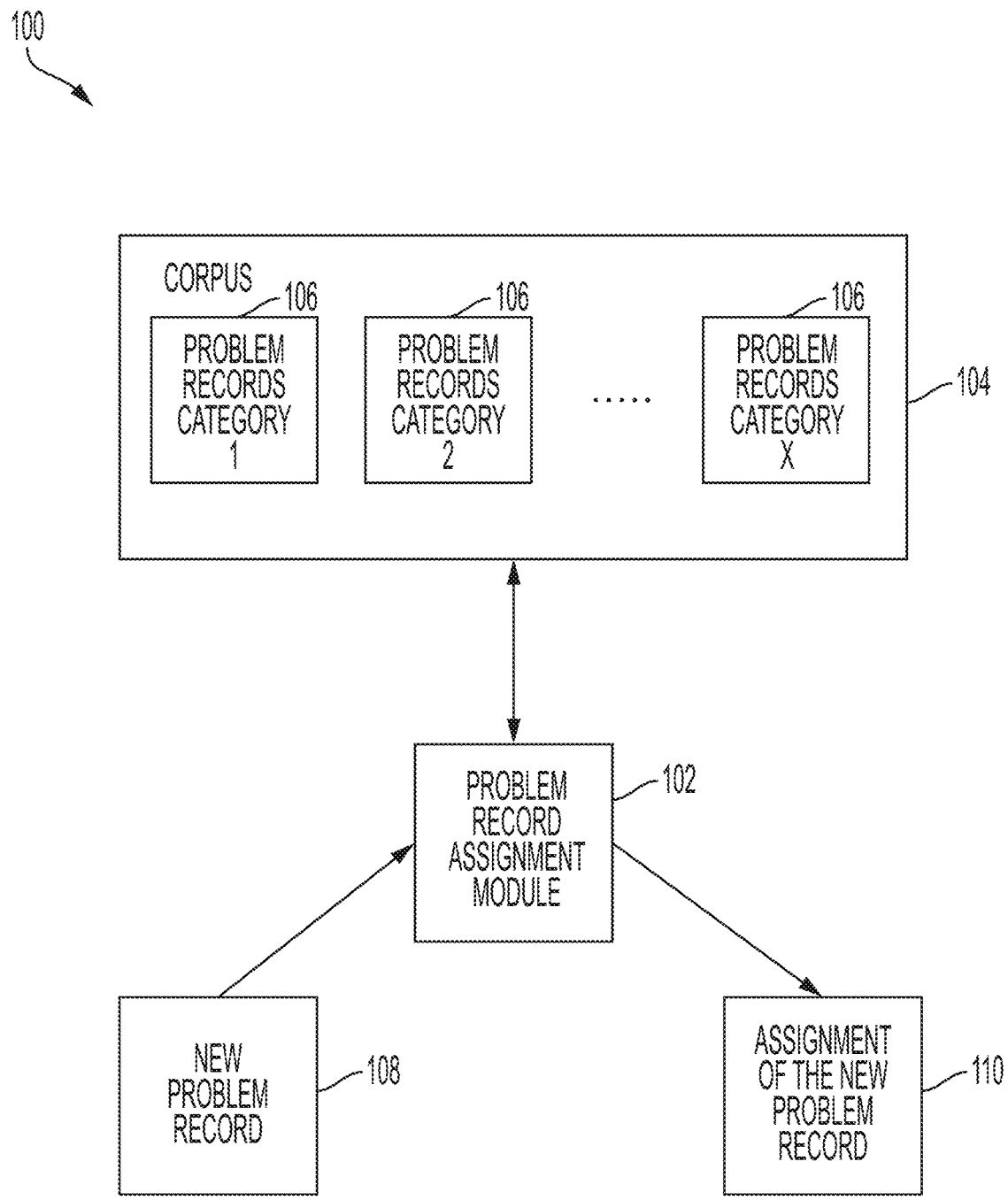
FIG. 1 depicts a block diagram of a system for assigning new problem records according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention assign new problem records to a person or group of people for problem resolution. In accordance with one or more embodiments of the present invention, the assigning is performed based on a similarity of new problem records to previously assigned problem records. Assigning new problem records based on a similarity to previously assigned problem records improves problem record assignment accuracy, which reduces test time and field problem resolution time. One or more embodiments of the present invention can be used to automatically assign new problem records, to verify problem record assignments, and/or to identify features of previously misclassified problem records. Future incorrect component/owner assignments can be avoided by analyzing existing problem records that were originally incorrectly assigned and using this information for future problem record assignments.

When testers of a computer system detect a problem with the system they will often write a description of the problem and collect logs, traces and other data about the problem. The testers will then try to assign each detected problem to the component team they feel will most likely be able to fix the problem, but even the most experienced testers will not always accurately assign all of the problems that are detected to the correct component team. Problem records can include information such as, but not limited to: a title of the problem record, a date that the problem record was opened, an assigned owner of the problem record, a severity of the problem, a summary of the problem, a component(s) or product(s) causing the problem, a lifecycle phase (e.g., unit test, production in the field, etc.) when the problem was opened, and comments about the problem. All or a subset of this information can be in the problem record as unstructured text.

It can be difficult to classify or categorize an isolated piece of text, such as a problem description, based just on the content of the text. This is especially true for complex systems, such as those with a significant number of interacting components under test or experiencing problems in the field. Depending on what category the text falls in, different actions might be taken. For example, in software defect tracking a problem ticket is opened to describe and track a software defect, but often the creator of the problem ticket (e.g., the tester, field support coordinator, etc.) does not know or cannot be certain of what component(s) or product(s) is causing the defect. This can make it difficult assign the software defect to the correct problem owner for problem resolution. In this example, the problem description in the problem ticket is the text needing to be categorized, and the category is problem owner (e.g., person or group of people) that should be assigned the defect.

It is possible to set predefined classification rules for the incoming problem records, but this approach alone is unlikely to make a substantial improvement in first assignment accuracy especially for complex systems with often changing assignment criteria.

In accordance with one or more embodiments of the present invention, assignment accuracy is improved by not simply analyzing the isolated problem description but by also comparing it with the text of previous correctly classified documents to categorize incoming data. In the software defect example, when a new problem ticket is opened, the text of this new problem ticket is compared to text in previous problem tickets to identify those that are most similar. Comparing the text of the new document with the text of old documents results in a more accurate assessment of which category the new document most likely belongs in.

Contemporary methods of classifying text include the bag-of-words model which uses an order-less representation of text that only considers the counts of words in the text. Another contemporary method of classifying text includes the use of an N-gram model which allows for the consideration of groupings of words but is more suited to predicting the next item in a series. Regular expressions can also be used to identify patterns in the text, but this requires predefining patterns and may not be accurate when text is worded differently.

One or more embodiments of the present invention utilize a target similarity-difference gradient method on combined pieces of text to categorize a new document (e.g., a new problem record). The target similarity-difference gradient method can be used to identify the most similar documents (e.g., those containing the most similar problem records) in a corpus relative to a target (e.g., a new problem record) which can be a document, a record, or a string of text. A target similarity calculation can be used to identify relevant content in a corpus of documents or records. In accordance with one or more embodiments, a term frequency (TF) list is created for one or more documents of a corpus. An inverse document frequency (IDF) is calculated for each listed term, and a TFIDF is calculated for each listed term. A similarity ranking for one or more documents of the corpus is determined using a target similarity calculation based on the TFIDF for each listed term. Additionally, a difference gradient portion can also be utilized to locate and isolate similarities in documents as well as to further identify and locate distinctions between the identified similar documents. Accordingly, the relevance of records and documents in a corpus in light of a target document or record (e.g., a new problem record) can be determined in a simplified manner that reduces computational requirements.

Accurate problem assignment can be challenging, and inaccurate assignments can result in significant delays in resolving problems. For example, it is not uncommon, during system testing, for a complex system to have a thousand problems that have been identified and that need to be addressed. Assuming that there are one thousand problem records, and that ten percent of the problem records are assigned incorrectly, and that it takes two days for the group to whom each problem record is incorrectly assigned to do the initial analysis of the failure and then attempt to funnel the problem record to the correct problem owner for problem resolution, incorrect problem assignment adds two hundred days to the problem resolution time of the one thousand problem records.

One or more embodiments of the present invention can be utilized for testing as well as for supporting problem records describing problems encountered in the field (e.g., at customer locations that are utilizing the computer systems) where delays in resolution time can directly impact customer satisfaction and potential future sales.

One or more embodiments of the present invention provide automatic categorization of problems based on the failing component, or problem owner, which can result in higher accuracy in problem record assignment. In addition, less human time is wasted investigating an issue, or problem, in order to determine which team to send it to.

The problem record assignment described herein utilizes a corpus of previously assigned problem records and does not require any training processes or building of a machine learning model. The problem record owners of previously assigned problem records can be assumed to be correct, for example, when the problem record is closed and/or when the assigned problem record owner accepts the assigned problem record.

Turning now to FIG. 1, a block diagram of components of a system 100 for assigning new problem records is generally shown in accordance with one or more embodiments of the present invention. The components shown in FIG. 1 include a corpus 104 of documents 106, a program record assignment module 102, a new problem record 108 to be assigned, and an assignment of the new problem record 110. In accordance with one or more embodiments of the present invention, the components shown in FIG. 1 may be located on the same computer processor. In accordance with one or more other embodiments of the present invention, all or a subset of the components are located on different computer processors and/or memory devices that communicate with each other via a computer network such as network 665 of FIG. 6 below.

As shown in FIG. 1, each document 106 includes one or more problem records that have been categorized based on the problem record owner that has been assigned to the problem record. As shown in FIG. 1, all of the existing problem records in each of the documents 106 have been assigned to the same problem record owner. Existing problem records assigned to problem record owner 1 are in category 1 and stored together in the same document 106, existing problem records assigned to problem record owner 2 are in category 2 and stored together in the same document 106, and existing problem records assigned to problem record owner x are in category x and stored together in the same document 106. An embodiment of a method where existing problem records are categorized, or grouped, is described below in reference to FIG. 2. The corpus 104 can be stored in any manner known in the art including, but not limited to, in a database or in a storage record. In addition, the corpus 104 can be stored on any type of memory or storage devices known in the art.

As shown in FIG. 1, a new problem record 108 is input to the problem record assignment module 102, and the problem record assignment module 102 outputs a suggested assignment of the new problem record 110. The new problem record 108 and the assignment of the new problem record 110 can be stored in any manner known in the art including, but not limited to, in a database or in storage record. In addition, the new problem record 110 and the assignment of the new problem record 110 can be stored on any type of memory or storage devices known in the art. The processing performed by the problem record assignment module 102 executing on a computer processor to generate an assignment of the new problem record 110 is described below in reference to FIG. 3.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, programs, functional blocks, connections between functional blocks, modules, inputs, outputs, etc.). For example, the problem record assignment module 102 may also generate the corpus 104 as well as perform the assignment of the new problem record 110. In other embodiments, these functions may be performed by separate modules operating on the same or different computer processors. Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
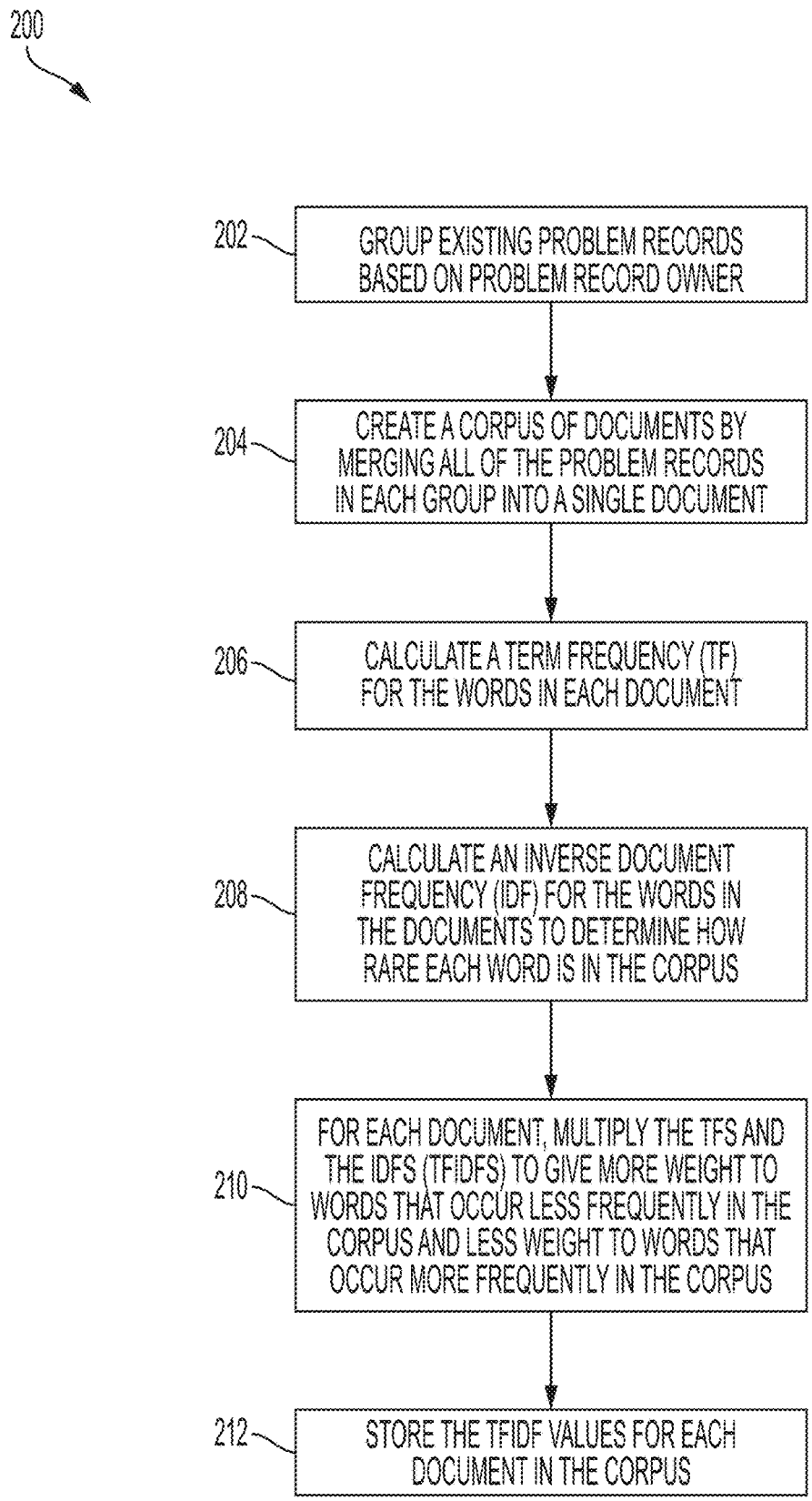
FIG. 2 depicts a process flow diagram of a method for generating a corpus of existing problem records according to one or more embodiments of the present invention.

Turning now to FIG. 2, a process flow diagram of a method 200 for generating a corpus of existing problem records is generally shown according to one or more embodiments of the present invention. The processing shown in FIG. 2 may be executed by a standalone computer processor and/or by a node in a cloud, such as node 10 in FIG. 4 below. In one or more embodiments of the present invention, the processing shown in FIG. 2 is performed by problem record assignment module 102 of FIG. 1.

At block 202, existing problem records that were previously assigned to problem record owners are grouped based on their currently assigned problem record owners. Each group of program records includes existing problem records that are currently assigned to the same problem record owner. The assigned problem record owner is the person (or department or team) that resolved, or fixed, the problem described in the problem record. For problem records that were originally assigned to an incorrect problem record owner, the assigned problem record owner may be updated once the correct problem record owner is identified. In accordance with one or more embodiments of the present invention, the problem records may be further partitioned based on a time that they were opened (e.g., in the previous 90 days, in the previous 91-180 days, more than 180 days ago) and/or a lifecycle phase (e.g., unit testing, integration testing, production, etc.) when a problem record was opened. By grouping documents based on both problem record owner and a time that the problem record was opened, current trends in problem record assignment can be given more weight than older trends when assigning new problem records. By grouping documents based on both problem record owner and lifecycle phase, differences in problem record owners at different phases can be taken into account when assigning new problem records.

At block 204 of FIG. 2, a corpus of documents, such as corpus 104 of FIG. 1, is created by merging, or appending, the problem records in each group into a single document, such as documents 106 of FIG. 1. Each group has an assigned problem record owner. At block 206, the term frequencies (TFs) for the words, or terms, in each document are calculated. In accordance with one or more embodiments of the present invention, the TFs are calculated for only a subset of the words in each document. Words may be filtered out based, for example, on parts of speech (e.g., conjunctions are removed, stop words are removed) and/or a custom set of rules (e.g., a customized set of stop words for a technical document). Stemming or lemmatization of the remaining words in the document may be performed on the remaining words in the document to combine different forms of the same word.

One or more embodiments of the present invention utilize a form of term weighting known as the Luhn Assumption where the weight of a term that occurs in a document is proportional to the term frequency (TF). TF is the number of occurrences of each word, or term, in the record or document. One or more embodiments of the present invention utilize a normalized TF so as to not give higher weighting to a larger document. This can be calculated by dividing the number of times a term appears in the document by the sum of all TFs. This calculation produces a decimal fraction between 0 and 1. If the term does not appear at all in the document, the normalized TF of the term is zero. If the term is the only term in the document, then the normalized TF is one. Thus, the more prevalent the term is in the document, the closer the normalized TF will be to one.

At block 208, an inverse document frequency (IDF) is calculated for each word (or a subset of the words after filtering, stemming and/or lemmatization) in the corpus. The IDF can be calculated by taking the log of the total number of documents in the corpus divided by the number of documents in which the term appears. The IDF is used to give more weight to rarer terms in the corpus. The IDF for any term is the same across the entire corpus. For example, consider the case where every document contains one of the input terms. In this case, this input term is of little value in helping zero-in on the most relevant documents. When the term appears in all documents, the IDF is equal to zero. The rarer the term across the corpus, the closer the value of the IDF will be to the order of magnitude of the number of documents in the corpus. For example, if there are 1,000 documents and only one contains the input term, the IDF would be equal to three, and if there were 100,000 documents and only one contains the input term, the IDF is equal to five.

At block 210 of FIG. 2, each TF and its corresponding IDF for words in the document are multiplied (resulting in TFIDFs) to give more weight, or importance, to words that occur less frequently in the corpus and less weight to words in the document that occur more frequently in the corpus. At block 212, the TFIDF values are stored for each document in the corpus. In accordance with one or more embodiments of the present invention, the TFIDF values for each document are stored as an n-dimensional vector of TFIDF, where n is the number of words being analyzed for the document after the filtering described above.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
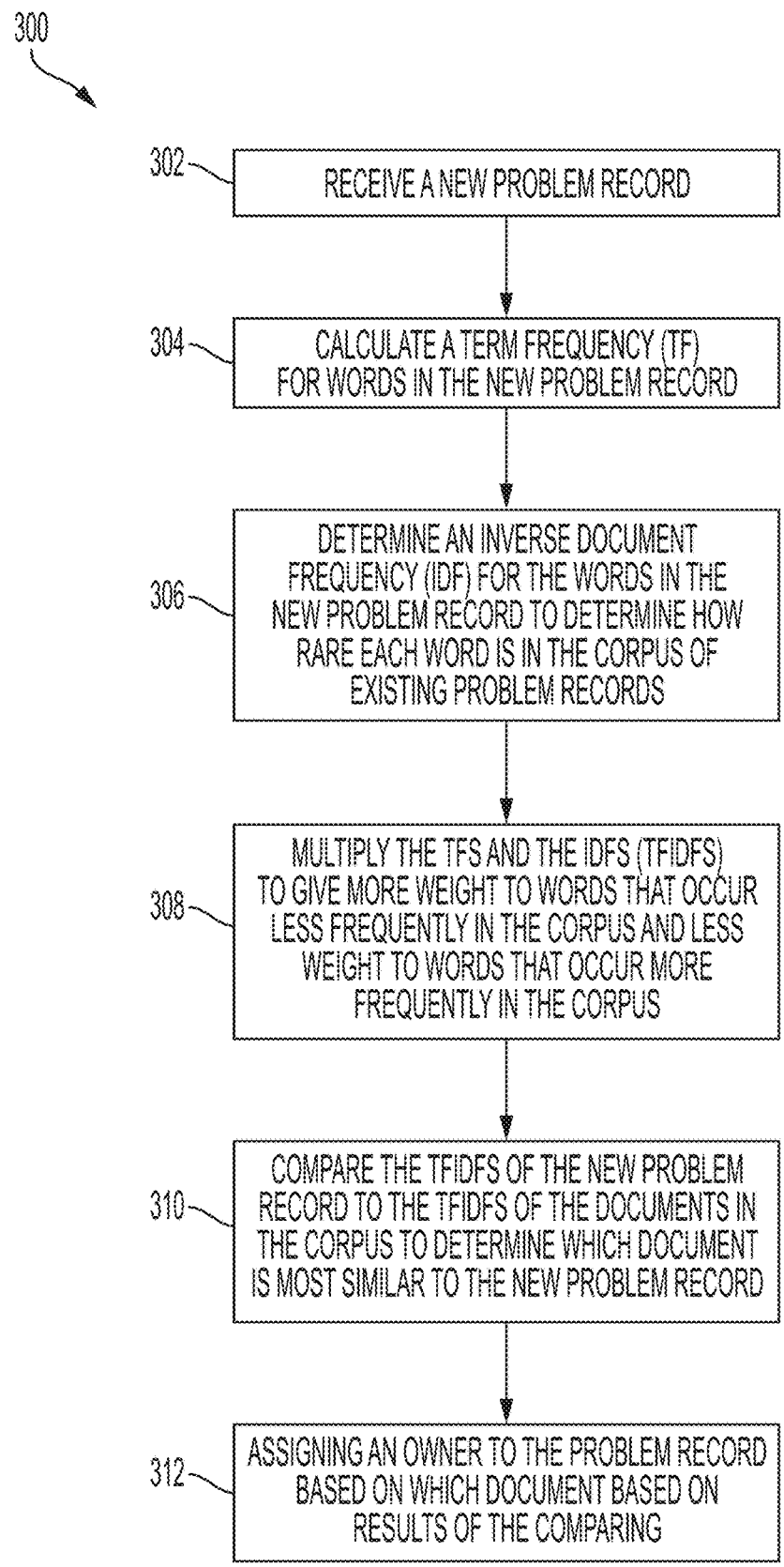
FIG. 3 depicts a process flow diagram of a method for assigning a new problem record according to one or more embodiments of the present invention.

Turning now to FIG. 3, a process flow diagram of a method 300 for assigning a new problem record is generally shown according to one or more embodiments of the present invention. The processing shown in FIG. 3 may be executed by a standalone computer processor and/or by a node in a cloud, such as node 10 in FIG. 4 below. In one or more embodiments of the present invention, the processing shown in FIG. 2 is performed by problem record assignment module 102 of FIG. 1.

At block 302, a new problem record, such as new problem record 108 of FIG. 1, is received. At block 304, the TFs for the words, or terms, in the new problem record are calculated. In accordance with one or more embodiments of the present invention, the TFs are calculated for only a subset of the words in the new problem record. Words may be filtered out as described above with reference to block 206 of FIG. 2. Stemming or lemmatization of the remaining words in the new problem record may be performed on the remaining words in the new problem record to combine different forms of the same word. At block 306, IDFs for each of the words (or a subset of the words after filtering, stemming and/or lemmatization) in the new problem record are determined. The IDFs that were calculated when the documents 106 in the corpus 104 were created can be accessed at block 306. In accordance with one or more embodiments of the present invention, the IDFs are stored in the corpus. The IDFs are used to determine how rare each of the words are in the corpus of existing problem records.

At block 308, the product of the TF and IDF (TFIDF) is calculated for each term (or a subset of the words after filtering, stemming and/or lemmatization) in the text of the new product record. This produces an n-dimensional vector of TFIDF weights for the new product record where n is equal to the number of terms in the new document. As known in the art, a vector is a list of terms in a row or a column that in some cases may be a subsection of a larger matrix of terms.

At block 310, the TFIDFs of the new problem record are compared to the TFIDFs of the documents in the corpus to determine which document(s) in the corpus is most similar to the new problem record. In accordance with one or more embodiments of the present invention, this includes calculating the dot-product or cosine similarity between the n-dimensional input TFIDF vector for the new problem record and the TFIDF vector for each document in the corpus.

In accordance with one or more embodiments, the TFIDF for each input term (the number of input terms is "n") in the target document (e.g., new problem record) is multiplied by the TFIDF for the same term in each document in the corpus to create a similarity vector. The product for each of the similarity vector terms is summed, and the total is divided by the resultant for each of the n-dimensional vectors. This essentially normalized value represents an overall similarity score of each corpus document relative to the new problem record. Each term in the new problem record is multiplied to itself and since each TFIDF value for each term will match exactly since they are identical, the similarity score will almost always have the highest value since it is a perfect match. Each resultant (i.e., each n-dimensional vector) is calculated using the square root of the sum of the square of each element (or dimension) of the vector.

For "cosine similarity" the "target resultant" is used for the new problem record and the resultant for each document in the corpus is used for each document. The target resultant is the square root of the sum of the squares for the TFIDF values for the document vector of interest. Dividing by the resultant effectively normalizes the value of each term TFIDF value.

For "target similarity" the resultant is used for both the new problem record and the corpus documents since in almost all cases the new problem record resultant will be larger than the resultant for each corpus document since the corpus document term will be zero if there is not a corresponding term in the corpus document. In this case, the TFIDF value of each word in the target document (e.g., the new problem record) is multiplied by the corresponding TFIDF value for each same word for each document in the corpus one at a time. The resultant in this case is the square root of the sum of the squares for the vector created by multiplying the corresponding word TFIDF together. The target similarity technique simplifies the calculations because the resultant for each document in the corpus no longer needs to be calculated.

The document with the highest score is considered the one with the greatest relevance to the new problem record. For example, if the document does not contain an input term from the new problem record, the TFIDF product of the new problem record term and the corpus document term equals zero. Documents that have a large number of rare input terms from the new problem record relative to documents in the rest of the corpus will have a higher TFIDF value for that input term. Again, the document with the highest score is weighted as the document that best corresponds to the similarity query.

At block 312, an owner is assigned to the new problem record based on the results of the comparing at block 310. The problem record owner assigned to the new problem record is the problem record owner of the existing problem record(s) in the document deemed to be most similar to the new problem record.

In accordance with one or more embodiments of the present invention, once the new problem record is assigned to a problem record owner, the new problem record is automatically transferred to the problem record owner for problem resolution.

In accordance with one or more embodiments of the present invention, where a person (e.g., a tester) controls the transfer of new problem records to the problem record owner, the assignment is sent to the person and the person uses the assigned problem record owner from the system as a suggestion of who should be responsible for fixing the problem. The person can override the problem record owner assigned by the system.

In accordance with one or more embodiments of the present invention, where a person (e.g., a tester) inputs a suggestion for the problem record owner, the assigned problem record owner is compared to the suggested problem record owner input by the person. If the two match, the new problem record is automatically transferred to the assigned problem record owner for problem resolution. If the two do not match, then the assignment is sent to the person for use in determining who should be responsible for fixing the problem. The person can override the problem record owner assigned by the system.

In accordance with one or more embodiments of the present invention, future incorrect owner assignments can be avoided by analyzing existing problem records that were originally incorrectly assigned and using this information for future problem record assignments.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

An example of using one or more embodiments of the present invention for a software defect tracking system is described below. One skilled in the art will recognize that embodiments are not limited to software defect tracking as the techniques described herein can be applied to any system where text is categorized.

In this example, a system development team has a defect tracking database that is populated with defects. A defect, or problem ticket, may contain various pieces of information, such as the description of the problem and the component/product/team that is responsible for the piece of software that the defect was found in. Assigning a defect to the proper team might not be straightforward since the error might be vague or non-readable to humans (e.g., a stack trace, a memory dump, etc.). Also, it may not be clear from the problem symptoms which area the defect should be assigned to because often more than one component will be involved. For example, what appears to be a computer microprocessor problem could actually be a microprocessor code bug or an issue with computer memory or an I/O adapter. Assigning the defect to the wrong team can lead to delays in resolving the problem. Automatically assigning the defect to the correct area will result in the right people investigating the defect more quickly.

The existing problem tickets are separated based on the category (problem ticket owner). It is assumed that previous defects are eventually all assigned to the correct teams. This is a reasonable assumption because even if the problem ticket was opened to the wrong team, after more thorough investigation the tickets are reassigned to the team that fixes the problem. One or more embodiments of the present invention can allow for it to be more likely that the ticket is assigned to the correct team the first time.

All problem tickets for each category are merged into one large document for that category. The documents can be appended together to easily create one document with the text from all the problem tickets of that category (e.g., problem owner).

Using each of the documents, a corpus is created, where each document encompasses the text of problem tickets for a specific category. The TF for each word in each document is calculated along with the IDF for each word in the corpus. The product of the TF and IDF (TFIDF) for each term is calculated.

When a new defect is written up, the target similarity-difference gradient method can be used to calculate the target-similarity of the new defect to each existing document. This will tell how closely related the text from the defect is to each document in the corpus. The category for the document with the highest relevance will then be used as the owner for the defect.

Text similarity can change as the test progresses in time. This can be due to the problems associated with different components may be related to different areas of the design or different component functions. One of more embodiments of the present invention addresses the shift, if detected, by creating time dependent documents for performing the similarity analysis.

One or more embodiments of the present invention can utilize the text from past problem records that were assigned inaccurately initially to identify problems that might be similar and avoid inaccurate assignment in the future.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
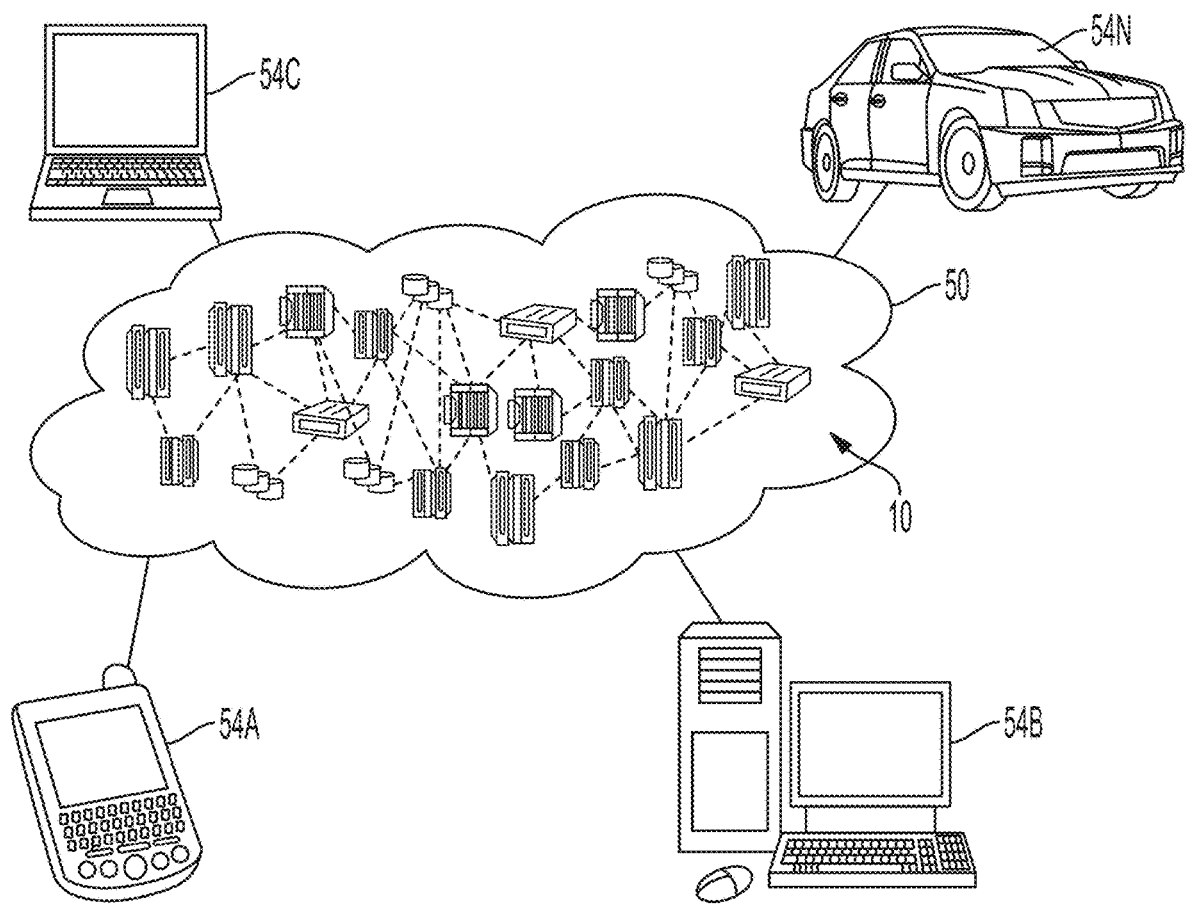
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
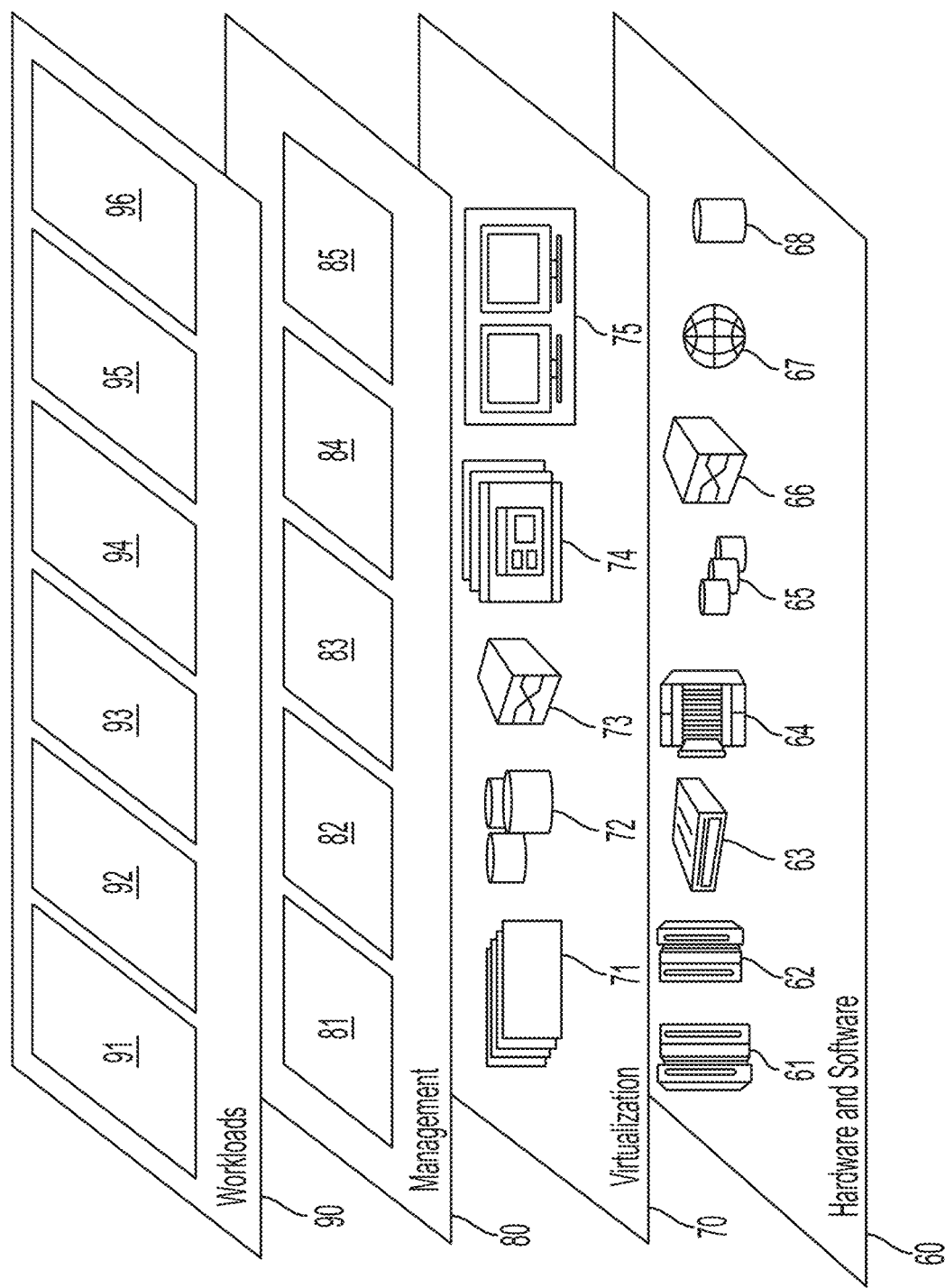
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and problem record assignment 96.

It is understood that one or more embodiments of the present invention are capable of being implemented in conjunction with any type of computing environment now known or later developed.

Figure 6:
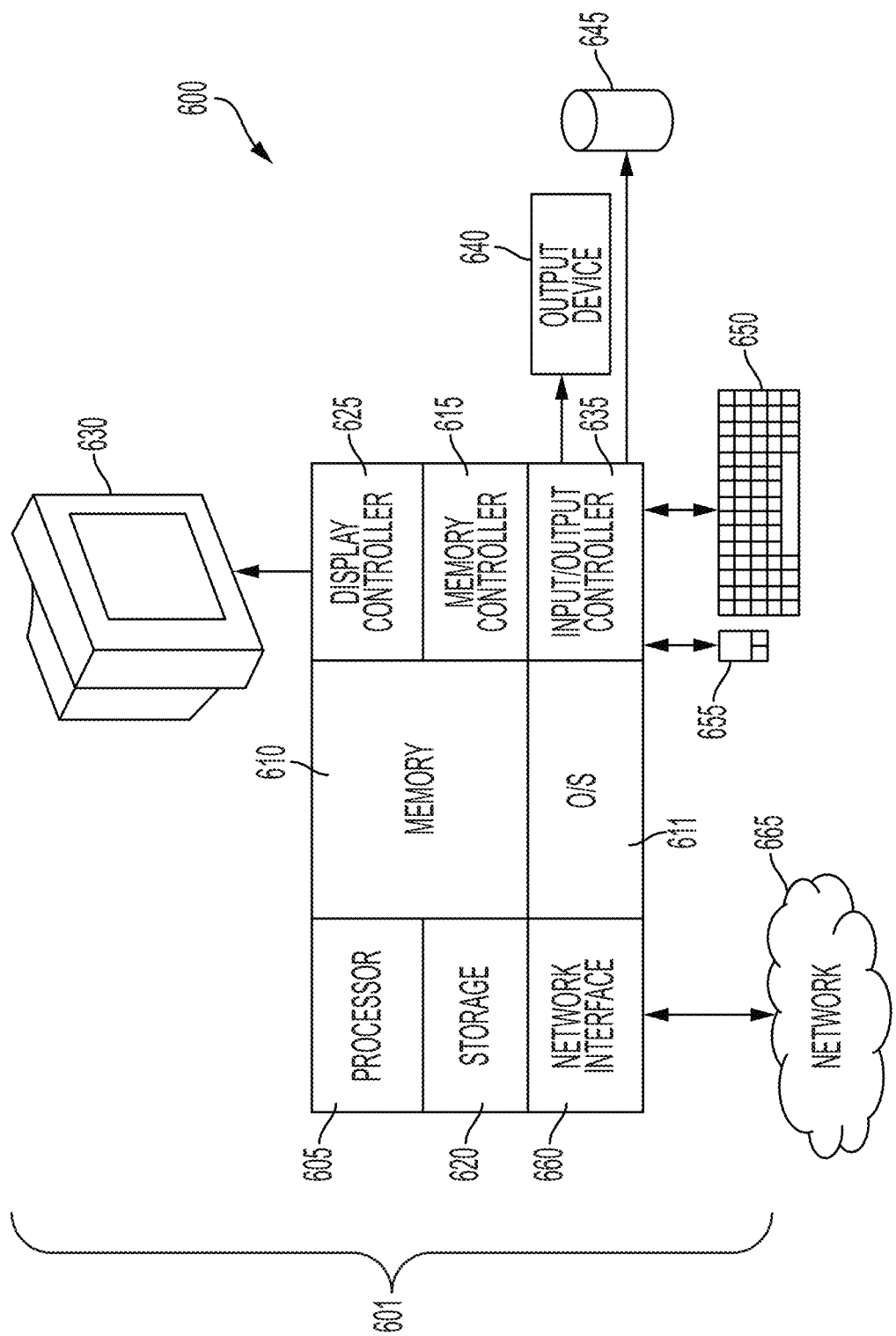
FIG. 6 illustrates a system for buffer overflow trapping according to one or more embodiments of the present invention.

Turning now to FIG. 6, a computer system for assigning new problem records is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals. The network 665 may be implemented by the cloud computing environment 50 of FIG. 4.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   receiving, by a processor, a new problem record;
   accessing, by the processor, a corpus of existing problem records that were previously assigned to problem record owners and grouped into documents based on their assigned problem record owners, each document having an assigned problem record owner;
   identifying, by the processor, a document in the corpus that is most similar to the new problem record, the identifying comprising comparing text in the new problem record to text in the documents, the comparing comprising:
      calculating term frequencies of words included in the new problem record;
      weighting each of the term frequencies of words included in the new problem record based at least in part on a number of times that the corresponding word included in the new problem record occurs in the corpus;
      accessing weighted term frequencies for the documents in the corpus; and
      comparing the weighted term frequencies of words included in the new problem record to the weighted term frequencies for the documents in the corpus,
      wherein the new problem record and each of the documents in the corpus are represented by a vector of terms that each include, for each of the terms, a product of a term frequency of the term and an inverse document frequency, wherein a similarity of the new problem record to each of the documents is determined based at least in part on a normalized sum of a dot product of the vectors corresponding to the new problem record and the document, and wherein the similarity is utilized to identify a document in the corpus that is most similar to the new problem record; and
   assigning, by the processor, the new problem record to the problem record owner that is assigned to the identified document.

2. The method of claim 1, wherein the document that is most similar to the new problem record is the document that has weighted term frequencies that most closely align with the weighted term frequencies of words included in the new problem record.

3. The method of claim 1, wherein at least a subset of the existing problem records were initially assigned to an incorrect problem record owner and the identifying further comprises:
   comparing the text in the new problem record to text in the at least a subset of the existing problem records that were initially assigned to an incorrect problem record owner.

4. The method of claim 1, wherein the identifying further comprises utilizing a cosine similarity method to determine a document that is most similar to the new problem record.

5. The method of claim 1, wherein the identifying utilizes a dot-product method to determine a document that is most similar to the new problem record.

6. The method of claim 1, wherein the identifying further comprises utilizing a target similarity-difference gradient method to determine a document that is most similar to the new problem record.

7. The method of claim 1, further comprising adding the new problem record to the document in the corpus.

8. The method of claim 1, wherein the corpus of existing problem records are further grouped into documents based on a time that they were first opened.

9. A system comprising:
one or more processors for executing computer readable instructions, the computer readable instructions controlling the one or more processors to perform operations comprising:
receiving a new problem record;
accessing a corpus of existing problem records that were previously assigned to problem record owners and grouped into documents based on their assigned problem record owners, each document having an assigned problem record owner;
identifying a document in the corpus that is most similar to the new problem record, the identifying comprising comparing text in the new problem record to text in the documents, the comparing comprising:
calculating term frequencies of words included in the new problem record;
weighting each of the term frequencies of words included in the new problem record based at least in part on a number of times that the corresponding word included in the new problem record occurs in the corpus;
accessing weighted term frequencies for the documents in the corpus; and
comparing the weighted term frequencies of words included in the new problem record to the weighted term frequencies for the documents in the corpus,
wherein the new problem record and each of the documents in the corpus are represented by a vector of terms that each include, for each of the terms, a product of a term frequency of the term and an inverse document frequency, wherein a similarity of the new problem record to each of the documents is determined based at least in part on a normalized sum of a dot product of the vectors corresponding to the new problem record and the document, and wherein the similarity is utilized to identify a document in the corpus that is most similar to the new problem record; and
assigning the new problem record to the problem record owner that is assigned to the identified document.

10. The system of claim 9, wherein the document that is most similar to the new problem record is the document that has weighted term frequencies that most closely align with the weighted term frequencies of words included in the new problem record.

11. The system of claim 9, wherein at least a subset of the existing problem records were initially assigned to an incorrect problem record owner and the identifying further comprises:

comparing the text in the new problem record to text in the at least a subset of the existing problem records that were initially assigned to an incorrect problem record owner.

12. The system of claim 9, wherein the identifying further comprises utilizing a cosine similarity method to determine a document that is most similar to the new problem record.

13. The system of claim 9, wherein the identifying further comprises utilizing a target similarity-difference gradient method to determine a document that is most similar to the new problem record.

14. The system of claim 9, wherein the operations further comprise adding the new problem record to the document in the corpus.

15. A computer program product comprising a computer readable storage medium having program instructions embodied therewith, the program instructions executable by a processor to cause the processor to perform operations comprising:
receiving a new problem record;
accessing a corpus of existing problem records that were previously assigned to problem record owners and grouped into documents based on their assigned problem record owners, each document having an assigned problem record owner;
identifying a document in the corpus that is most similar to the new problem record, the identifying comprising comparing text in the new problem record to text in the documents, the comparing comprising:
calculating term frequencies of words included in the new problem record;
weighting each of the term frequencies of words included in the new problem record based at least in part on a number of times that the corresponding word included in the new problem record occurs in the corpus;
accessing weighted term frequencies for the documents in the corpus; and
comparing the weighted term frequencies of words included in the new problem record to the weighted term frequencies for the documents in the corpus,
wherein the new problem record and each of the documents in the corpus are represented by a vector of terms that each include, for each of the terms, a product of a term frequency of the term and an inverse document frequency, wherein a similarity of the new problem record to each of the documents is determined based at least in part on a normalized sum of a dot product of the vectors corresponding to the new problem record and the document, and wherein the similarity is utilized to identify a document in the corpus that is most similar to the new problem record; and
assigning the new problem record to the problem record owner that is assigned to the identified document.

* * * * *